UNITED STATES PATENT OFFICE 1,922,342

POLYMERIZATION OF COUMARONE

George Kenneth Anderson, Pittsburgh, Pa., assignor to The Neville Company, a Corporation of Pennsylvania No Drawing. Application February 13, 1932
Serial No. 592,854

10 Claims. (Cl. 260—7)

This invention relates to a polymerizing process for the production of coumarone resin.

The object of the invention is to produce a clear, transparent resin of adequately high melting point for use as a varnish resin, which is highly soluble, being readily and completely soluble in petroleum distillate alone, as well as in coal distillate solvents such as naphtha and the "light" oil products.

The question of solubility of the synthetic resins is one of importance. In order to provide an inexpensive varnish base it is desirable that a petroleum distillate, for example petroleum benzine, may be used as a solvent. The petroleum distillate solvents are less expensive that the coal distillate solvents, such as naphtha, and if not intentionally used initially to dissolve the resin, they are frequently added during the final manufacture or mixing of the paint or varnish in which the resin is incorporated. As a solvent for solid resin, solvent naphtha, which may be considered as comprising the light oil products derived from the distillation of coal, has a higher solvent action than the petroleum distillates. A mixed solvent comprising both solvent naphtha and a petroleum distillate is also frequently used.

It is a requisite of a resin solution for varnish and paint uses that the resin be wholly dissolved, and that the solution be capable of subjection to relatively low temperatures without precipitation. If the resin does not possess the requisite degree of solubility in the particular solvent employed there is a tendency for the separation and precipitation of resinous bodies when the solution is subjected to low temperatures. This tendency towards separation and precipitation is more marked when a petroleum distillate is used as the solvent than when a coal distillate, such as solvent naphtha, or a mixture of petroleum distillate and coal distillate is used.

My special resin as produced by the process hereinafter described is readily dissolved, at room temperature, by one of the lighter petroleum distillates, such for example as petroleum benzine. When in solution it possesses a low separation temperature, so that no material separation occurs at normal temperatures. Obviously it may be dissolved, if desired, in a solvent naphtha, where unusual conditions, tending to produce separation, are to be encountered; or, similarly, it may be dissolved in a mixed solvent of coal distillate and petroleum distillate. With either petroleum distillate or coal distillate used as a solvent, or when dissolved in a mixed solvent under normal conditions of temperature, separation and/or precipitation is not produced by the addition of a light petroleum distillate introduced as a thinner or the like.

While obtaining in my resin this unusually high degree of solubility, I have retained a melting point sufficiently high to insure the provision of a resin content which will permit varnish to dry in a thin, hard, and complete film.

It is usual practice to conduct the process of polymerizing the resin-forming ingredients, occurring in crude solvent naphtha, drip oil, or other substances containing ingredients susceptible of polymerization into resinous bodies, in the presence of a relatively great body of diluent. According to different processes this diluent is in some instances a coal distillate, such as benzol, and according to other processes is a petroleum distillate such as petroleum benzine. Such a dilution has not, however, been carried to great lengths, because of problems of manufacturing economy. If the concentration of crude solvent naphtha, for example, in a diluent be very low, obviously only a relatively small quantity of synthetic resin is formed by polymerization, and recovered by the attendant steps of washing, neutralization, and distillation.

In polymerization processes as heretofore conducted, unless the temperature be exceedingly low, the action of polymerization is rapid, proceeding in a "surge," with a rapid rise in temperature covering a relatively great range. In accordance with my method, the polymerizing action itself is conducted slowly and within the limits of a narrow range of temperature. My method, moreover, is in effect a polymerization in bulk, thus rendering it practicable commercially.

Desirably I conduct my polymerization in a kettle provided with a cooling jacket. Into this kettle I introduce a mixture or blend of a material, such as crude solvent naphtha, containing the resin-forming bodies, and a diluent, such as petroleum benzine or refined coal naphtha. This blend comprises a relatively small percentage of the crude solvent naphtha.

In order that the rate of temperature rise within the kettle may be under control, I initially establish heat transfer relation between the blend in the kettle and the cooling water in the jacket. In order that the heat transfer differential may initially tend to abstract heat from the blend, the temperature of the blend should be several degrees centigrade higher than the temperature of the cooling water. With these conditions established, the blend in the kettle is agitated in usual manner, and a suitable catalyst, or polymerizing agent, is added in a quantity sufficient to effect polymerization of the polymerizable ingredients in the quantity of resin-bearing liquid present in the blend.

Under the conditions established, the actual step of polymerization proceeds slowly, and the continuous transfer of heat from the blend in the kettle prevents the occurrence of a rapid or extensive rise in temperature. In the state of dilution existing, it is impossible for the polymerizing agent to immediately make contact with all of the polymerizable ingredients present, and a retarded polymerizing action is necessarily effected. The polymerizing action, in so far as the initial charge of crude solvent naphtha, or the like, is concerned, is carried to substantial completion, desirably by a slow continued addition of catalyst. This results in the formation of a relatively small percentage of polymers in the total volume of blend, and the formation of a relatively refined naphtha produced by polymerization of the crude solvent naphtha. This refined naphtha and the polymers themselves are apparently inert to further polymerization, thus in effect adding to the total volume of diluent present.

After the initial polymerization step has been completed, an additional small charge of crude solvent naphtha, together with an appropriate quantity of polymerizing agent, is added to the batch. This batch, as indicated above, comprises the initial charge of diluent, the polymers formed by the preceding integral polymerization step, and the substantially refined naphtha formed during polymerization of the crude solvent naphtha. This succeeding integral polymerization is also permitted to proceed to substantial completion, thus adding both to the body of polymers present and to the body of diluent. This succeeding integral polymerization proceeds, like the initial polymerization, slowly, and without a rapid or extensive rise in temperature.

The integrated polymerization process, comprising the successive addition of small charges of material for polymerization, together with the requisite quantity of polymerizing agent, is continued until a concentration of polymers is obtained which is either sufficiently great to warrant economical recovery from the batch, or so great as to materially hamper any further polymerization steps. The batch is then washed, is treated for neutralization and removal of the polymerizing agent, the diluent is distilled off, and the resin recovered either as a viscous or solid resin.

Because of the fact that each individual polymerizing step in the progression is slow, and occurs in a relatively great state of dilution, heat transfer during each integral polymerization may maintain the temperature of the batch within a narrow range. Due to the fact that there is no reaction "surge" during the entire process, there is a remarkable uniformity in the conditions existing throughout the entire process, and theoretically in the molecular nature of the polymers produced by it. The temperature range is narrow, irrespective of the conditions set up for the process. For example, I have conducted the process with a rise in the temperature of the batch confined within a range of 30° C. to 35° C. I have also conducted the process at a temperature range between 50° C. and 60° C. The temperature range for the process may be initially established by the temperature of the cooling medium, and correspondingly higher initial temperature of the blend acted upon.

The process is fundamentally a bulk process, because it may be conducted in a single large kettle, and because the entire body of diluent, save the diluent which is formed by polymerization, is initially present. The process thus effects on a commercial scale polymerization in a state of dilution which has heretofore been merely a theoretical or laboratory condition.

Solidified resin obtained as a product is transparent, light in color, and is of sufficiently high melting point to be used for substantially all purposes for which coumarone resin generally considered, is suitable. It possesses specifically the distinguishing characteristic that it may be readily cut cold with a petroleum distillate solvent; and when in solution it does not tend to separate or produce a precipitate at normal low temperatures, the solution so made up having an unusually low precipitation, or separation, temperature.

While there is a wide range of possibilities in the specific conditions established for the process, for the purpose of clarity I shall briefly describe one exemplary set of conditions under which the process has been conducted.

In such exemplary run I mix a blend comprising five per cent. of crude solvent naphtha and ninety-five per cent. of petroleum benzine. The temperature of this blend prior to polymerization is regulated to about 30° C. Sulphuric acid is added as a catalyst, and its addition is continued in a thin stream during polymerization. Cooling water surrounding the kettle into which I introduce the blend is at a temperature of approximately 15° C. During the initial integral polymerization of the crude solvent naphtha present, the temperature is maintained within the range of approximately 30 to 35° C.

Each succeeding integral polymerization step involves the addition of crude solvent naphtha in a quantity equal to approximately five per cent. of the total volume of the mixture then present, and the introduction of an appropriate addition of sulphuric acid. This additional charge may be introduced at a temperature sufficiently low to rapidly cool the contents of the kettle again to about 30° C. By so doing, the same temperature range exists during each integral polymerization.

The progression is continued until a concentration amounting to substantially twenty-five per cent. of polymers exists in the batch. The total quantity of acid utilized in carrying the process to this point may be from three per cent. to five per cent. the total volume of the batch of 66° Bé. sulphuric acid. The process of polymerization may then be considered complete for purposes of recovery. The usual further succession of steps for recovering solid resin from the batch are employed.

My progressive catalytic polymerization process effects a purpose which cannot be effected merely by gradual addition of the catalyst. In catalytic polymerizations having a tendency to proceed with a "surge," even though the catalyst be gradually added, my process avoids the occurrence of such "surge," and confines the temperature of reaction within a narrow range, by positively limiting the concentration of the essential material for polymerization which is at any time present. Thus, while a concentration of excess catalyst is gradually built up by slow, or progressive addition of catalyst, a concentration of polymerizable ingredients is not built up, for the reason that the progressively added material for polymerization is progressively rendered inert. It is apparent that the principles upon which my process depends, apply to all simple catalytic polymerizations presenting the same problems, outlined above, and occurring under the same general conditions, as are present in the catalytic polymerization of crude solvent naphtha.

I claim as my invention:

1. The herein described catalytic polymerization method for the production of coumarone resins comprising the preparation of a batch containing a relatively small percentage charge of crude solvent naphtha and a relatively large percentage charge of hydrocarbon distillate diluent, establishing heat transfer relations for the abstraction of heat from the batch to control reaction temperature in the batch, effecting catalytic polymerization of the resin-forming bodies of the crude solvent naphtha present in the batch controlling the temperature of the polymerizing reaction by heat abstraction from the batch, after substantial completion of such polymerization step introducing to the existing batch a succeeding small percentage charge of crude solvent naphtha, and effecting integral catalytic polymerization of this succeeding charge in the presence of the pre-existing batch.

2. The herein described catalytic polymerization method for the production of coumarone resins comprising the preparation of a batch containing a relatively small percentage charge of crude solvent naphtha and a relatively large percentage charge of hydrocarbon distillate diluent, establishing heat transfer relations for the abstraction of heat from the batch to control reaction temperature in the batch, effecting catalytic polymerization of the resin-forming bodies of the crude solvent naphtha present in the batch, controlling the temperature of the polymerizing reaction by heat abstraction from the batch, after substantial completion of such polymerization step introducing to the existing batch a relatively small succeeding charge of crude solvent naphtha, effecting substantially complete catalytic polymerization of this succeeding charge in the presence of the pre-existing batch, and similarly continuing the polymerization of successive small charges of crude solvent naphtha in the batch existing prior to each successive step.

3. The herein described catalytic polymerization method for the production of coumarone resins comprising the preparation of a batch containing a relatively small percentage charge of crude solvent naphtha and a relatively large percentage charge of hydrocarbon distillate diluent, establishing heat transfer relations for the abstraction of heat from the batch to control reaction temperature in the batch, effecting substantially complete catalytic polymerization of the resin-forming bodies of the crude solvent naphtha present in the batch, controlling the temperature of the polymerizing reaction by heat absorption from the batch, chilling a relatively small succeeding charge of crude solvent naphtha to a temperature materially below the temperature of the preceding integral polymerization step, adding this succeeding chilled charge to the pre-existing batch, and effecting catalytic polymerization of this succeeding charge in the presence of the pre-existing batch the temperature of which has been lowered by admixture of the additional chilled charge.

4. The herein described catalytic polymerization method for the production of coumarone resins comprising the preparation of a batch containing a relatively small percentage charge of crude solvent naphtha and a relatively large percentage charge of hydrocarbon distillate diluent, establishing heat transfer relations for the abstraction of heat from the batch to control reaction temperature in the batch, effecting substantially complete catalytic polymerization of the resin-forming bodies of the crude solvent naphtha present in the batch, controlling the temperature of the polymerizing reaction by heat abstraction from the batch, chilling a relatively small succeeding charge of crude solvent naphtha to a temperature materially below the temperature of the preceding integral polymerization step, adding this succeeding chilled charge to the pre-existing batch, effecting substantially complete catalytic polymerization of this succeeding charge in the presence of the pre-existing batch the temperature of which has been lowered by the admixture of the additional chilled charge, and similarly continuing the polymerization of successive small charges of chilled crude solvent naphtha in the batch existing prior to each successive step.

5. The herein described catalytic polymerization method for the production of coumarone type resins comprising the preparation of a batch containing a relatively small percentage charge of a starting liquid containing resin-forming bodies of the coumarone type and a relatively large percentage charge of an organic liquid diluent inert under the conditions of the process, establishing heat transfer relations for the abstraction of heat from the batch to control reaction temperature in the batch, effecting catalytic polymerization of the resin-forming bodies present in the batch, controlling the temperature of the polymerizing reaction by heat abstraction from the batch, after substantial completion of such polymerization step introducing to the existing batch a succeeding relatively small percentage charge of liquid containing resin-forming bodies, and effecting catalytic polymerization of this succeeding charge in the presence of the pre-existing batch.

6. The herein described catalytic polymerization method for the production of synthetic resins comprising the preparation of a batch containing a relatively small percentage charge of a starting liquid containing resin-forming bodies of the coumarone type and a relatively large percentage charge of an organic liquid diluent inert under the conditions of the process, establishing heat transfer relations for the abstraction of heat from the batch to control reaction temperature in the batch, effecting catalytic polymerization of the resin-forming bodies present in the batch, controlling the temperature of the polymerizing reaction by heat abstraction from the batch, after substantial completion of such polymerization step introducing to the existing batch a succeeding relatively small percentage charge of liquid containing resin-forming bodies, effecting substantially complete catalytic polymerization of this succeeding charge in the presence of the pre-existing batch, and continuing the polymerization of successive small charges of liquid containing polymerizable resin-forming bodies in the batch existing prior to each successive step.

7. The herein described catalytic polymerization method for the production of coumarone type resins comprising the preparation of a batch containing a relatively small percentage of a starting liquid containing resin-forming bodies of the coumarone type and a relatively large percentage charge of an organic liquid diluent inert under the conditions of the process, establishing heat transfer relations for abstraction of heat from the batch to control reaction temperature in the batch, effecting substantially complete catalytic polymerization of the resin-forming bodies present in the batch, controlling the temperature of the polymerizing reaction by heat abstraction from the batch, chilling a relatively small succeeding charge of liquid containing resin-forming bodies to a temperature materially below the temperature of the preceding integral polymerization step, adding this succeeding charge of chilled liquid to the pre-existing batch, and effecting integral catalytic polymerization of this succeeding charge in the presence of the pre-existing batch the temperature of which has been lowered by admixture of the additional charge.

8. The herein described catalytic polymerization method for the production of synthetic resins comprising the preparation of a batch containing a relatively small percentage charge of liquid containing resin-forming bodies of the coumarone type and a relatively large percentage charge of an organic liquid diluent inert under the conditions of the process, establishing heat transfer relations for abstraction of heat from the batch to control reaction temperature in the batch, effecting substantially complete catalytic polymerization of the resin-forming bodies present in the batch, controlling the temperature of the polymerizing reaction by heat abstraction from the batch, chilling a relatively small succeeding charge of liquid containing resin-forming bodies to a temperature materially below the temperature of the preceding integral polymerization step, adding this succeeding charge of chilled liquid to the pre-existing batch, effecting substantially complete catalytic polymerization of this succeeding charge in the presence of the pre-existing batch the temperature of which has been lowered by admixture of the additional charge, and similarly continuing the polymerization of successive small charges of liquid containing polymerizable resin-forming bodies in the batch existing prior to each successive step.

9. The herein described catalytic polymerization method for the production of coumarone type resins comprising the preparation of a batch containing a relatively small percentage charge of a starting liquid containing resin-forming bodies of the coumarone type and a relatively large percentage charge of a hydrocarbon distillate diluent, establishing heat transfer relations for the abstraction of heat from the batch to control reaction temperature in the batch, effecting catalytic polymerization of the resin-forming bodies present in the batch, controlling the temperature of the polymerizing reaction by heat abstraction from the batch, after substantial completion of such polymerization step introducing to the existing batch a succeeding relatively small percentage charge of liquid containing resin-forming bodies, and effecting catalytic polymerization of this succeeding charge in the presence of the pre-existing batch.

10. The herein described catalytic polymerization method for the production of coumarone type resins comprising the preparation of a batch containing a relatively small percentage charge of a starting liquid containing resin-forming bodies of the coumarone type and a relatively large percentage charge of a hydrocarbon distillate diluent, establishing heat transfer relations for the abstraction of heat from the batch to control reaction temperature in the batch, effecting catalytic polymerization of the resin-forming bodies present in the batch, controlling the temperature of the polymerizing reaction by heat abstraction from the batch, after substantial completion of such polymerization step introducing to the existing batch a succeeding relatively small percentage charge of liquid containing resin-forming bodies, effecting catalytic polymerization of this succeeding charge in the presence of the pre-existing batch, and similarly continuing the polymerization of successive small charges of liquid containing resin-forming bodies in the batch existing prior to each successive step.

GEORGE KENNETH ANDERSON.